US008687934B2

(12) United States Patent
Wright et al.

(10) Patent No.: US 8,687,934 B2
(45) Date of Patent: Apr. 1, 2014

(54) FIBER OPTIC COMPONENT HOLDERS AND ENCLOSURES AND METHODS INCLUDING THE SAME

(75) Inventors: William F. Wright, Fuquay Varina, NC (US); David Ray Radliff, Holly Springs, NC (US); William Joseph Curry, Angier, NC (US); Gary W. Adams, Holly Springs, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 233 days.

(21) Appl. No.: 13/052,808

(22) Filed: Mar. 21, 2011

(65) Prior Publication Data

US 2012/0243845 A1 Sep. 27, 2012

(51) Int. Cl.
*G02B 6/00* (2006.01)

(52) U.S. Cl.
USPC .......................................................... 385/135

(58) Field of Classification Search
USPC .......................................................... 385/135
See application file for complete search history.

(56) References Cited

U.S. PATENT DOCUMENTS

| 4,634,207 | A | | 1/1987 | Debbaut |
| 4,680,233 | A | | 7/1987 | Camin et al. |
| 4,761,052 | A | * | 8/1988 | Buekers et al. ............... 385/135 |
| 4,777,063 | A | | 10/1988 | Dubrow et al. |
| 5,079,300 | A | | 1/1992 | Dubrow et al. |
| 5,278,933 | A | | 1/1994 | Hunsinger et al. |
| 5,450,517 | A | * | 9/1995 | Essert ............................ 385/135 |
| 5,515,472 | A | | 5/1996 | Mullaney et al. |
| 5,590,234 | A | | 12/1996 | Pulido |
| 5,692,299 | A | | 12/1997 | Daems et al. |
| 5,922,458 | A | * | 7/1999 | Herlihy ......................... 428/343 |
| 6,009,225 | A | | 12/1999 | Ray et al. |
| 6,275,640 | B1 | | 8/2001 | Hunsinger et al. |
| 6,434,313 | B1 | | 8/2002 | Clapp, Jr. et al. |
| 6,507,691 | B1 | | 1/2003 | Hunsinger et al. |
| 7,116,886 | B2 | * | 10/2006 | Colgan et al. ................. 385/137 |

(Continued)

FOREIGN PATENT DOCUMENTS

| GB | 2238398 A | * | 5/1991 |
| JP | 2000066034 A | * | 3/2000 |
| WO | WO 94/05935 A1 | | 3/1994 |

OTHER PUBLICATIONS

Notification of Transmittal of the International Search Report and the Written Opinion of the International Searching Authority, or the Declaration in corresponding PCT Application No. PCT/US2012/028893 mailed Jun. 5, 2012 (12 pages).
Duncan et al.: "Measurement Good Practice Guide No. 26—Adhesive Tack"; © Crown Copyright 1999; ISSN 1368-6550; Jul. 1999; National Physical Laboratory; Teddington, Middlesex, UK.

(Continued)

*Primary Examiner* — Charlie Peng
(74) *Attorney, Agent, or Firm* — Myers Bigel Sibley & Sajovec, PA

(57) ABSTRACT

A method for securing a fiber optic component includes: providing a holding medium having a tack and mounted on a substrate; and placing the fiber optic component in intimate contact with the holding medium to thereby secure the fiber optic component to the substrate. The tack of the holding medium releasably bonds the fiber optic component to the holding medium and the holding medium retains its tack upon removal of the fiber optic component to permit re-placement of the fiber optic component or placement of a further fiber optic component on the holding medium to secure said fiber optic component or further fiber optic component to the substrate.

23 Claims, 7 Drawing Sheets

(56) References Cited

U.S. PATENT DOCUMENTS

| | | | |
|---|---|---|---|
| 7,298,952 | B2 | 11/2007 | Allen et al. |
| 7,440,668 | B2* | 10/2008 | Colgan et al. ............... 385/137 |
| 2002/0181923 | A1* | 12/2002 | Wojcik ........................ 385/135 |
| 2003/0031448 | A1* | 2/2003 | Simmons et al. ............ 385/134 |
| 2003/0138232 | A1* | 7/2003 | Abe et al. .................... 385/128 |
| 2003/0198426 | A1* | 10/2003 | Arima ........................... 385/14 |
| 2004/0161212 | A1* | 8/2004 | Sun et al. ..................... 385/114 |
| 2011/0026895 | A1 | 2/2011 | Baum et al. |
| 2011/0194830 | A1* | 8/2011 | Mullaney et al. ............ 385/136 |

OTHER PUBLICATIONS

FOSC 450 Gel-Sealed Fiber Optic Splice Closure—Ordering Guide; 32 pages; © 2004-2009 Tyco Electronics Corporation; Fuquay Varina, NC; www.tycoelctronics.com.

SMOUV Fiber Optic Fusion Splice Protector Sleeves; EnLighten FTTH Solutions; 2 pages; © 2005,2008 Tyco Electronics Corporation; Fuquay Varina, NC; www.tycoelctronics.com.

Notification Concerning Transmittal of International Preliminary Report on Patentability in corresponding PCT Application No. PCT/US2012/028893 mailed Oct. 3, 2013 (9 pages).

* cited by examiner

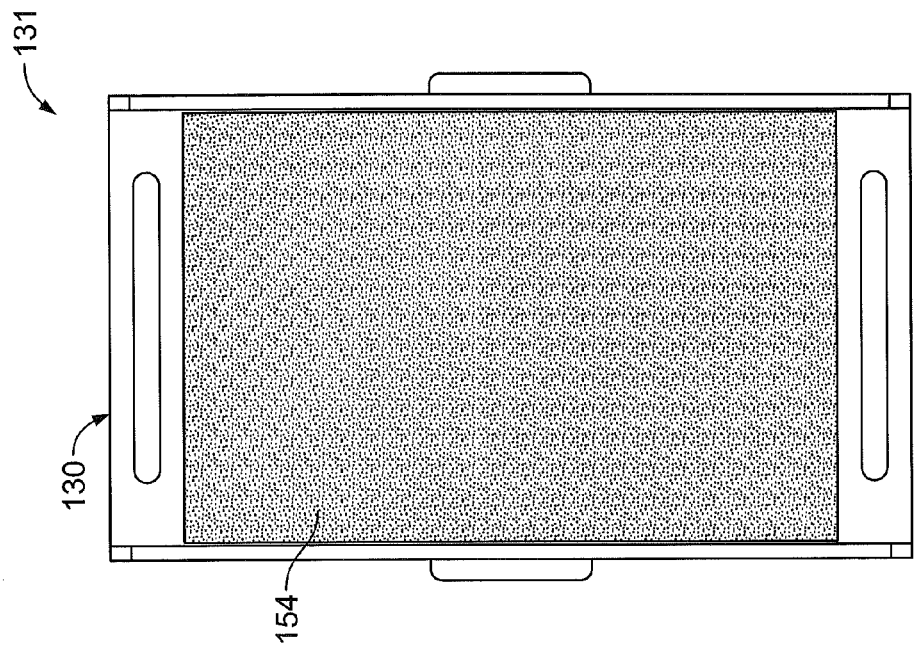
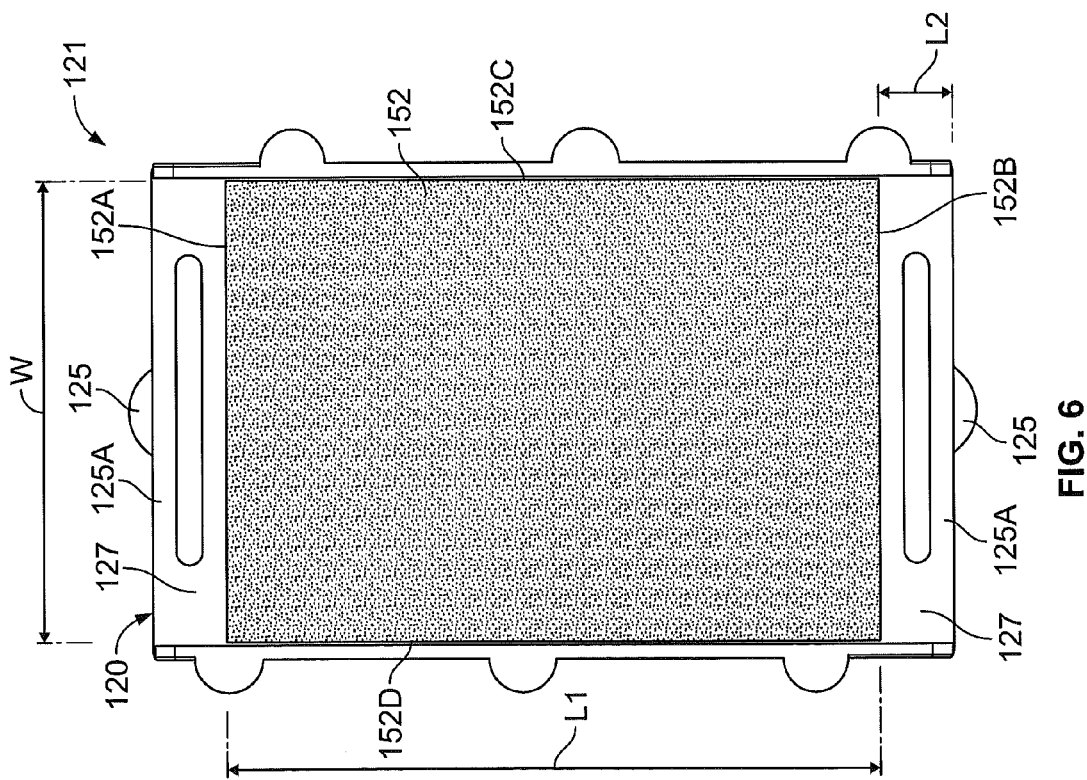
FIG. 6
FIG. 8

FIBER OPTIC COMPONENT HOLDERS AND ENCLOSURES AND METHODS INCLUDING THE SAME

FIELD OF THE INVENTION

The present invention relates to fiber optics and, more particularly, to fiber optic component holders, which may be employed in enclosures for fiber optic device connections.

BACKGROUND OF THE INVENTION

Optical fiber communications systems, employing fiber optic cables and digital electronics, are widely used in the telecommunication industry to transmit large volumes of data and voice signals over relatively long unrepeatered distances, and virtually noise free. Splice points and drop points for the fiber optic cables are required for most such systems. At a splice point, for example, all of the fibers at one end of a cable are spliced to corresponding fibers of a tandem cable. At a drop point or express splice point, some of the fibers may be spliced to a drop cable, while most of the fibers are passed through the drop point unaltered.

For both splice points and drop points, the optical fibers are exposed from the protective cable jacket to be spliced and secured within a splice closure. The splice closure typically includes a protective housing with either a single end cap through which cables penetrate, that is, a butt-splice; or dual opposing end caps through which respective cables penetrate, that is, an in-line splice.

A typical butt-splice closure, such as the model FOSC 450 enclosure made by Tyco Electronics Corporation, typically includes one or more splices organizers, or splice trays, disposed in stacked arrangement within the protective housing. The trays are pivotally connected at one end to a mounting bracket which, in turn, is connected to the inside face of the closure end cap. The pivotal connection permits individual splice trays to be temporarily moved to a raised position by the insertion of a removable spacer or clip near the pivot point. Accordingly, access is then available to the underlying splice tray, such as to check fiber routing or to remake a defective splice. The cables extending into the housing are secured therein and the penetration point sealed to prevent water from entering the protective housing.

One or more splice holders are also provided in the enclosure and are typically mounted on a splice tray. The splice holder may help to maintain the quality and longevity of optical fiber splices secured within the splice closure. The splice holder retains the individual splices between corresponding optical fibers. A typical splice holder may accommodate four to twelve splices and must adequately secure the splices in the presence of mechanical shocks and vibration. Fiber fusion splice locations are often protected by heat shrinkable protective sleeves. Alternatively, mechanical splices typically employ an assembly to maintain the optical fiber ends in precise alignment. There are a number of popular commercially available mechanical and fusion splice protection devices, most with different exterior dimensions. Splice holder devices typically accommodate only one type of protective sleeve or covering device. Known splice holder device designs use, for example, a series of spaced apart deformable walls of a foam material, pairs of opposing leaf springs, or a lid over the splice holder with a resilient pad positioned within the lid to hold the fiber splices within respective shallow grooves of the underlying splice holder.

SUMMARY OF THE INVENTION

According to method embodiments of the present invention, a method for securing a fiber optic component includes: providing a holding medium having a tack and mounted on a substrate; and placing the fiber optic component in intimate contact with the holding medium to thereby secure the fiber optic component to the substrate. The tack of the holding medium releasably bonds the fiber optic component to the holding medium and the holding medium retains its tack upon removal of the fiber optic component to permit re-placement of the fiber optic component or placement of a further fiber optic component on the holding medium to secure said fiber optic component or further fiber optic component to the substrate.

According to embodiments of the present invention, a fiber optic component holder for securing a fiber optic component includes a substrate to support the fiber optic component, and a holding medium mounted on the substrate. The holding medium has a tack such that, when the fiber optic component is placed in intimate contact with the holding medium, the holding medium releasably bonds with the fiber optic component to secure the fiber optic component to the substrate, and, upon removal of the fiber optic component from the holding medium, the holding medium will retain its tack to permit re-placement of the fiber optic component or placement of a further fiber optic component on the holding medium to secure said fiber optic component or further fiber optic component to the substrate.

According to embodiments of the present invention, a splice enclosure assembly for receiving optical fibers and protecting fiber optic splices between said optical fibers includes a housing and a fiber optic component holder. The housing assembly defines an environmentally sealed interior chamber when in a closed configuration. The fiber optic component holder is disposed in the interior chamber to secure a fiber optic component. The fiber optic component holder includes a substrate to support the fiber optic component, and a holding medium mounted on the substrate. The holding medium has a tack such that, when the fiber optic component is placed in intimate contact with the holding medium, the holding medium bonds with the fiber optic component to secure the fiber optic component to the substrate.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 6 is a top plan view of a lower holder subassembly forming a part of the fiber optic component holder of FIG. 5.

FIG. 8 is a top plan view of an upper holder subassembly forming a part of the fiber optic component holder of FIG. 5.

DETAILED DESCRIPTION OF THE EMBODIMENTS OF THE INVENTION

Figure 1:
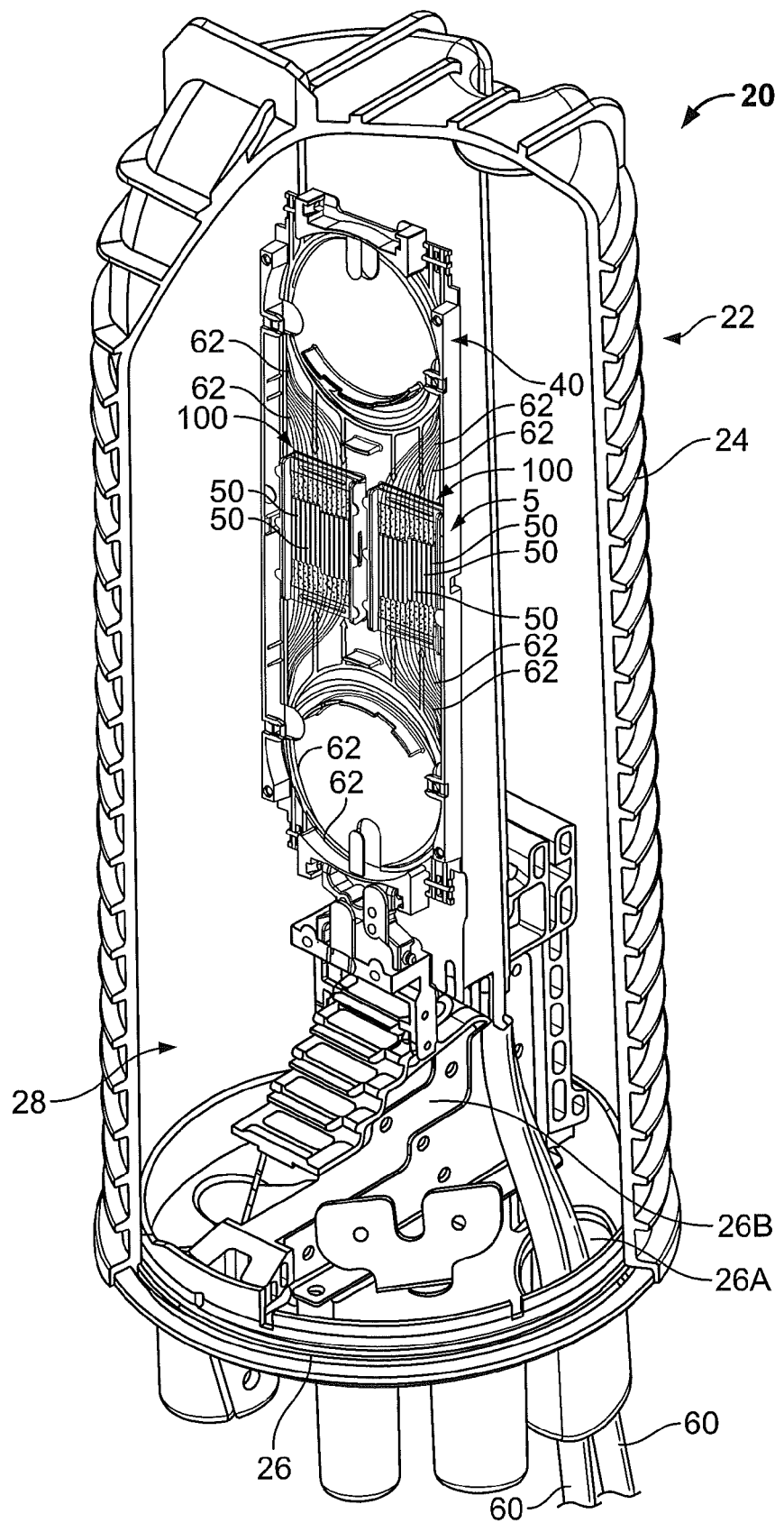
FIG. 1 is a front perspective view of a fiber optic splice enclosure according to embodiments of the present invention with a cover thereof cut away to show a splice tray and a pair of fiber optic component holders according to embodiments of the present invention disposed in the splice enclosure assembly.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, "fiber optic component" refers to an element of a fiber optic network, for example, an optical fiber or a "fiber optic device." "Fiber optic device" refers to fiber optic elements other than optical fibers and may include a "fiber optic connection device" or a non-connecting device. "Fiber optic connection device" refers to devices that receive terminal ends of at least two optical fibers that are operatively connected. The fiber optic connection device may itself be a connector (for example, a mechanical splice connector, a splitter, or an inline filter) or may be just a cover for a connection that does not itself form the connection (e.g., a splice sleeve).

Embodiments of the present invention provide a method and/or apparatus for securing a fiber optic component, such as a splice sleeve or other fiber optic device. According to methods of the present invention, a holding medium having a tack is provided mounted on a substrate. The fiber optic component is placed in intimate contact with the holding medium such that the fiber optic component is bonded to the holding medium by the tack of the holding medium. More particularly, the fiber optic component is releasably bonded to the holding medium (and, thereby, the substrate) by the tack and the holding medium retains its tack so that, if the fiber optic component is removed from the holding medium, the fiber optic component can be re-placed (i.e., rebonded) to the holding medium or a new fiber optic component can be bonded to the holding medium by the tack in place of the removed fiber optic component.

The method can provide a fiber optic network installer or technician with improved flexibility in that fiber optic components can be configured and reconfigured on the holding medium (and thereby the substrate) as desired. Moreover as compared to known methods for securing fiber optic components, the method may in some cases provide for greater space usage efficiency (i.e., by allowing more dense packing of the fiber optic components) and/or improved flexibility (e.g., in that it may not be necessary for fiber optic components to be sized or shaped to fit within certain prescribed slots on a custom engineered holding apparatus).

Figure 2:
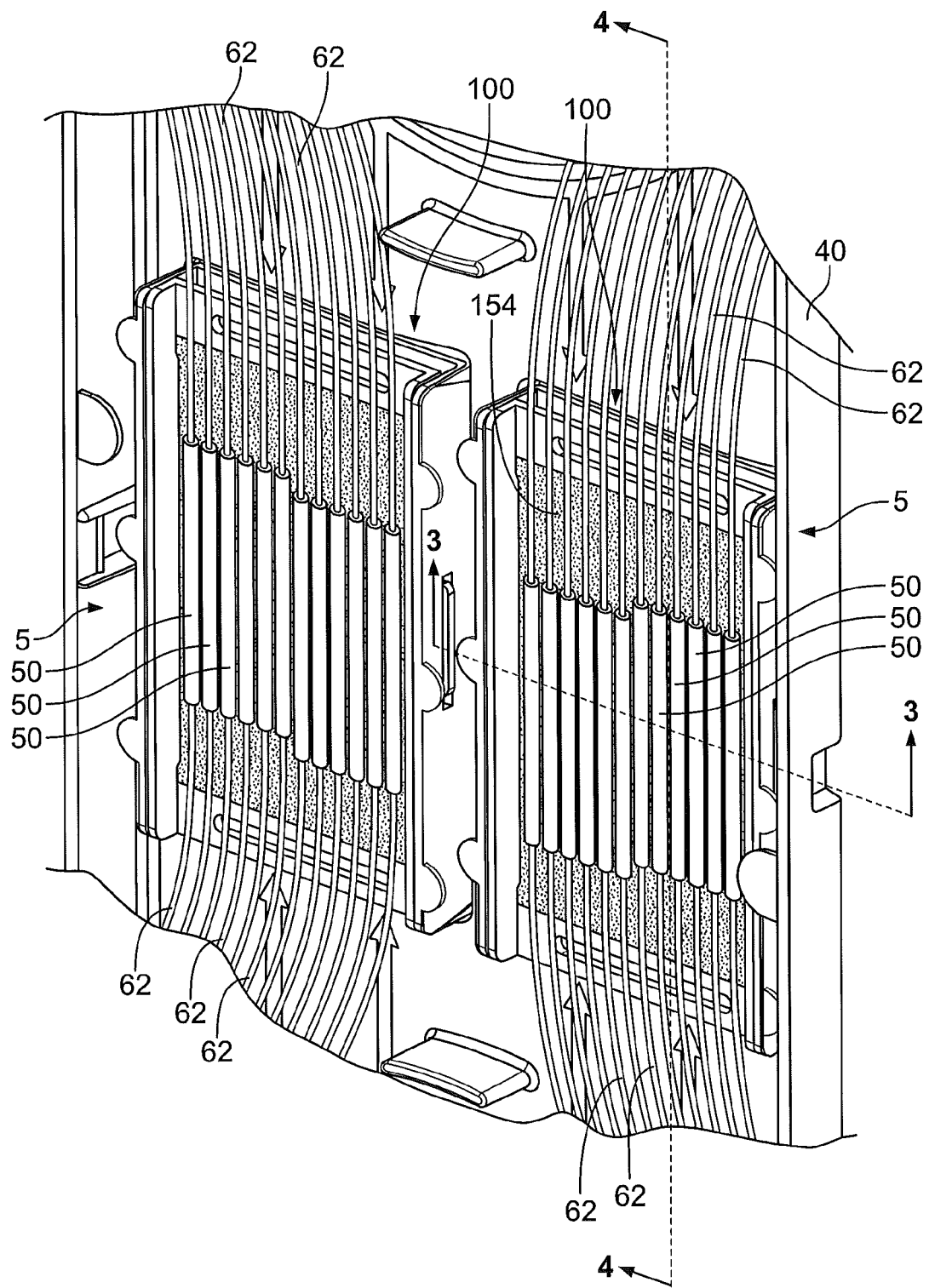
FIG. 2 is an enlarged, fragmentary, front perspective view of the splice tray and fiber optic component holders of FIG. 1 with a plurality of splice sleeves mounted on the fiber optic component holder.

With reference to FIGS. 1-10, a fiber optic component holder 100 according to embodiments of the present invention is shown therein. A fiber optic component such as a fiber optic splice sleeve 50 can be mounted in the fiber optic component holder 100 to form a fiber optic connection assembly 5 according to embodiments of the present invention as shown in FIGS. 1-4. The fiber optic connection device holder 100 may form a part of a fiber optic splice enclosure 20 according to embodiments of the present invention assembly as shown in FIGS. 1 and 2. As shown in FIGS. 1 and 2, the enclosure 20 includes two fiber optic component holders 100. Fiber optic cables 60 may be routed into the enclosure 20. Individual fibers 62 of the cables 60 may be spliced together. The spliced fiber location may be covered with a splice sleeve 50 and mounted in the holder 100 as described herein. The illustrated embodiment of the splice enclosure 20 is for a butt-splice enclosure; however, the features of the present invention may also be similarly and beneficially applied to an in-line or horizontal splice enclosure. Moreover, as discussed hereinbelow, the holder 100 and the enclosure 20 may be used to hold other types of fiber optic components.

Referring now to FIG. 1, the splice enclosure 20 includes a housing assembly 22 including a generally cylindrical or dome-shaped housing or cover 24 and an end cap 26 secured thereto collectively defining an environmentally sealed (e.g., waterproof under anticipated service conditions) chamber 28. One or more fiber optic cables 60 enter the housing assembly 22 through suitable openings 26A in the end cap 26. The cables 60 may be secured within the splice enclosure 20 by cable termination means, such as strain relief clamps.

One or more splice trays 40 (FIGS. 1, 2 and 5) are pivotally connected at one end to a mounting bracket 26B (FIG. 1) that, in turn, is connected to an inside face of the end cap 26. Each of the splice trays 40 may include one or a series of the fiber optic connection device holders 100. The individual splice trays 40 are movable between a stacked position and a raised position to facilitate access to an underlying splice tray 40 also as more fully described below. Each splice tray 40 has mounting features 42 (FIG. 5) configured to hold a fiber optic connection device holder 100.

The components 24, 26 and 40 may be formed of any suitable materials, such as rigid or semi-rigid polymeric materials.

Turning to the fiber optic component holder 100 in more detail, an exemplary fiber optic component holder 100 is shown in FIGS. 2-9. The holder 100 includes a support assembly 110 (FIG. 5) and masses of a holding medium 150 forming holding medium layers or beds 152 and 154.

Figure 5:
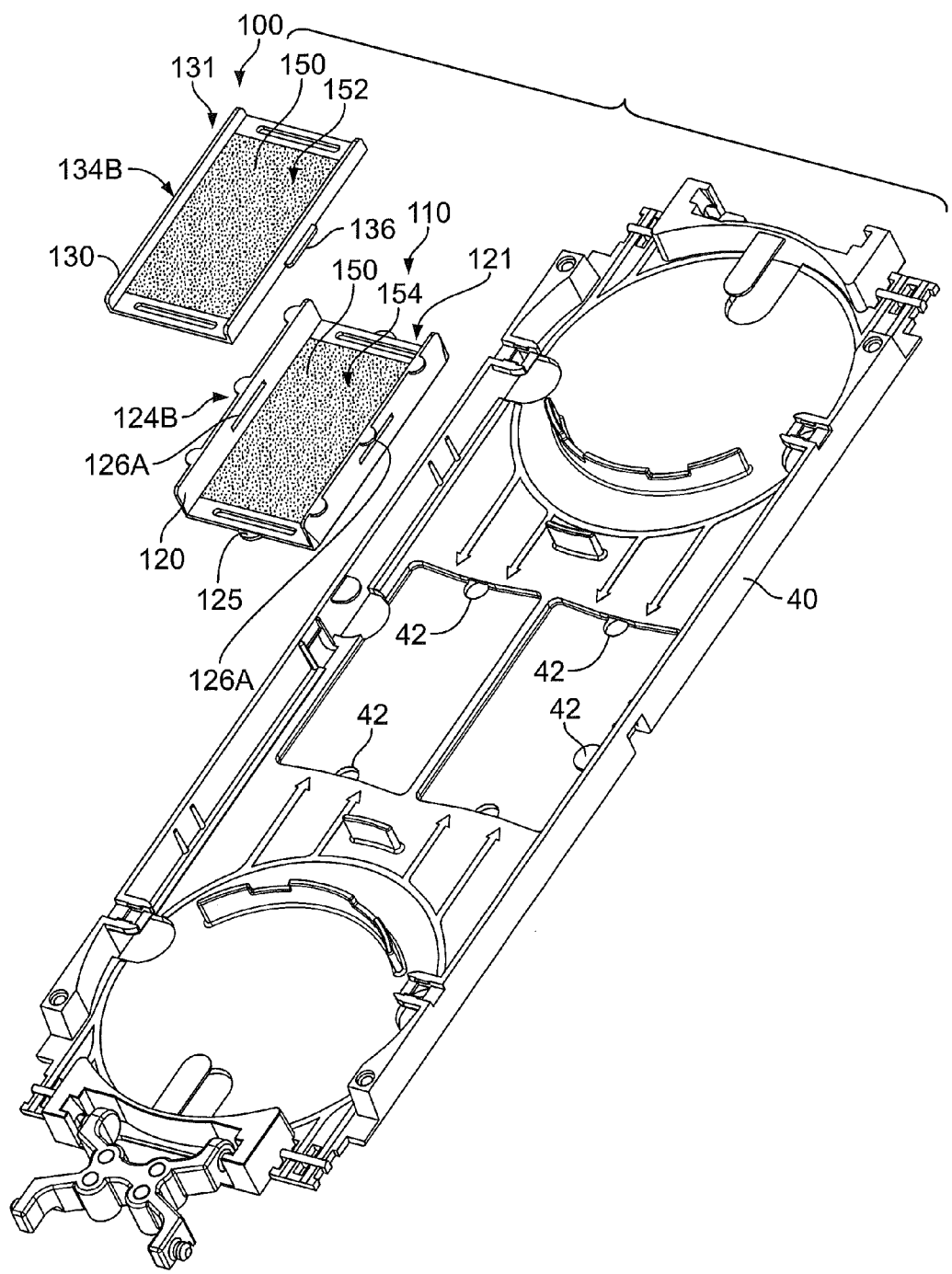
FIG. 5 is an exploded, front perspective view of the splice tray and a fiber optic component holder of FIG. 1.
Figure 9:
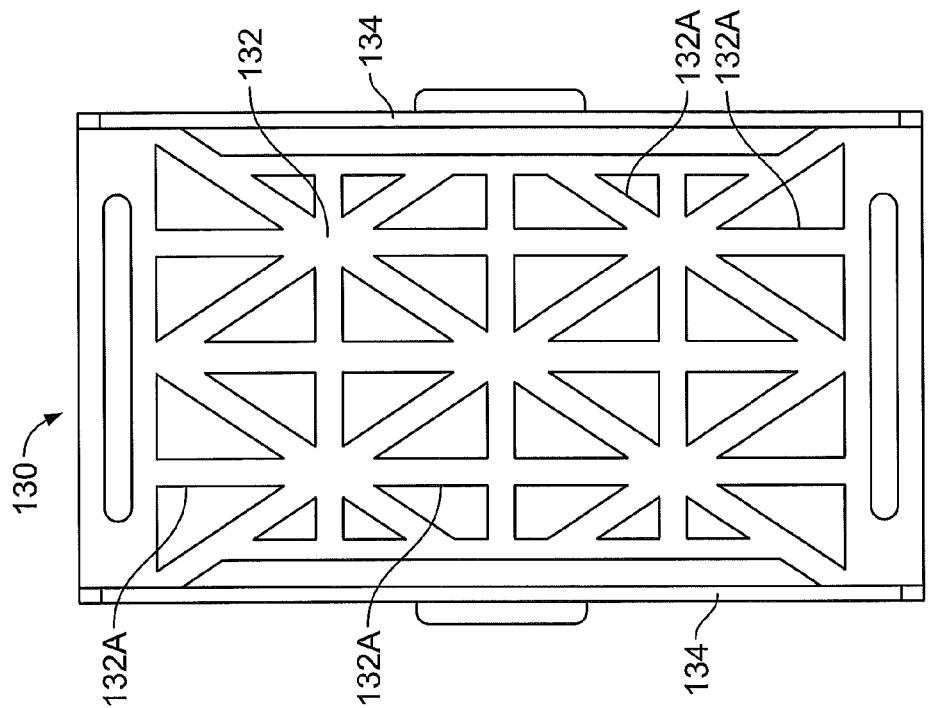
FIG. 9 is a top plan view of an upper shell member forming a part of the lower holder subassembly of FIG. 8.
Figure 7:
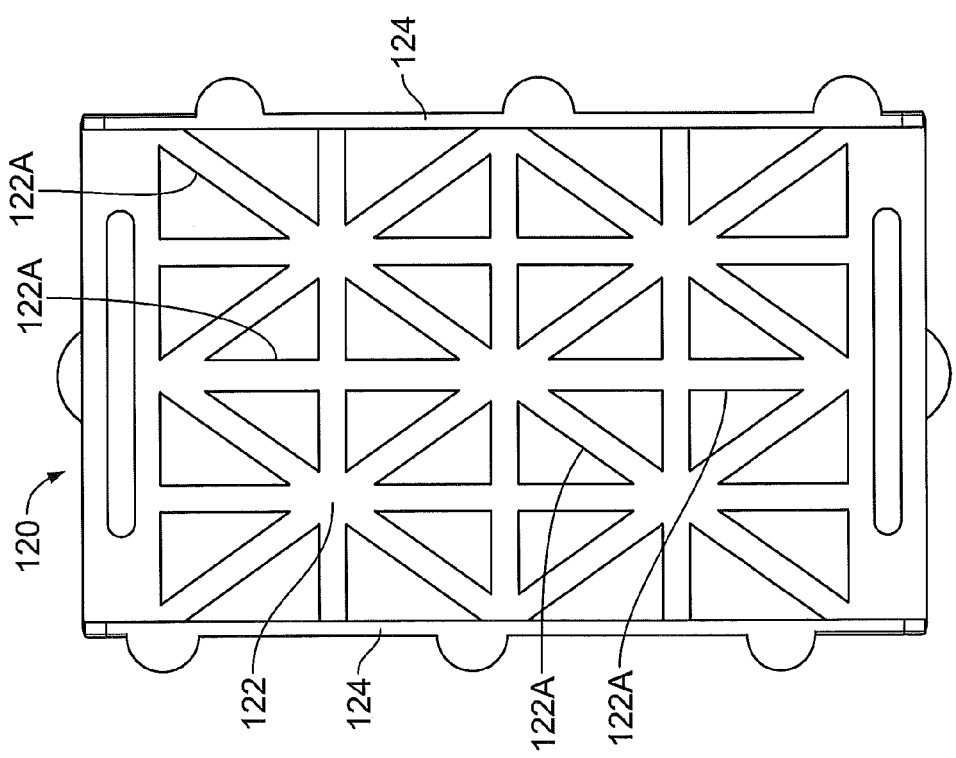
FIG. 7 is a top plan view of a lower shell member forming a part of the lower holder subassembly of FIG. 6.

The support assembly 110 has a longitudinal axis A-A (FIG. 4) and a lateral axis B-B (FIG. 3) and includes a first substrate or lower carrier or shell 120 (FIG. 7) and a second substrate or upper carrier or shell 130 (FIG. 9). The lower shell 120 includes a base wall 122 and a pair of upstanding, spaced apart sidewalls 124 defining a cavity 124B and end openings 124A. Similarly, the upper shell 130 includes a base wall 132 and sidewalls 134 defining a cavity 134B and end openings 134A. The base walls 122, 132 can include openings 122A, 132A (e.g., defining an open lattice as shown, or other base designed to support the holding medium; FIGS. 7 and 9) to enhance attachment to the holding material beds 152, 154. The lower shell 120 and the holding material bed 152 form, in combination, a holder subassembly 121 (FIG. 5).

The lower shell 120 is provided with integral mounting features such as tabs 125 (FIG. 6) to releasably couple the lower shell 120 to the splice tray 40 by interlocking with the mount features 42. Each tab 125 may be mounted on an integral spring wall 125A.

The lower shell 120 is further provided with mount features such as slots 126A (FIG. 3) that cooperate with corresponding integral mount features such as tabs 136 of the upper shell 130 to releasably couple the upper shell 130 to the lower shell 120. The sidewalls 124 and/or the sidewalls 134 may be provided with sufficient flexibility to allow elastic deflection and interlock between the tabs 136 and the slots 126A.

The shells 120, 130 may be formed of any suitable material. According to some embodiments, the shells 120, 130 are formed of a material that is rigid or semi-rigid in at least a temperature range of from about −40° C. to +60° C. According to some embodiments, the shells 120, 130 have a Young's modulus in the range of from about 2.0 to 3.4. According to some embodiments, the shells 120, 130 are formed of a vacuum formed or molded polymeric material. Suitable materials may include polycarbonate, PBT, polystyrene, polystyrene copolymers including HIPS, ABS, PVC, polypropylene, polyamide, polyphenylene oxide and alloys of any of the aforementioned polymers. The shell material may be any color or transparent.

According to some embodiments, the height H1 (FIG. 3) of the shell 120 is in the range of from about 9 to 10.5 mm. According to some embodiments, the height H2 (FIG. 3) of the shell 130 is in the range of from about 4.4 to 5.9 mm.

The holding medium bed 152 covers and is adhered or bonded to the base wall 122. In some embodiments, the shell 120 has a marginal section 127 (FIG. 6) on either end that is exposed (i.e., not covered by the holding material 150). According to some embodiments, the bed 152 forms a relatively thin layer of the holding medium 150 that is continuous from a laterally extending edge 152A to an opposing laterally extending edge 152B and is also continuous from a longitudinally extending edge 152C to an opposing longitudinally extending edge 152D (FIG. 6). In some embodiments, the bed 152 is substantially free of openings within the area defined by the edges 152A-D. According to some embodiments, the upper surface of the bed 152 is substantially smooth and planar. The lower surface of the bed 152 may conform to the contours of the base wall 122, including filling the openings 122A.

The holding medium bed 154 similarly covers and is adhered or bonded to the base wall 132 of the shell 130. The bed 154 may otherwise be configured and embody features as described above for the bed 152.

The holding medium 150 may be any suitable material capable of performing the functions described herein. According to some embodiments, the holding medium 150 is a material having sufficient tack for retention of the fiber optic components in service, sufficient releasability from the fiber optic components when the fiber optic components are deliberately removed, and compatibility with the material of the fiber optic components. In some embodiments, the holding medium 150 will not leave a significant residue on the fiber optic components when removed.

According to some embodiments, the holding medium 150 is a gel having the desired tack and other properties. According to some embodiments, the holding medium is a crosslinked polydimethyl siloxane polymer gel. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in the holding medium 150 may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference.

Other types of gels may be used for the holding medium 150, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S.

Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used for the holding medium 150 are EPDM rubber-based gels, as described in U.S. Pat. No. 5,177,143 to Chang et al.

The gel may include a variety of additives, including stabilizers and antioxidants. Other suitable additives include colorants, biocides, tackifiers and the like described in "Additives for Plastics, Edition 1" published by D.A.T.A., Inc. and The International Plastics Selector, Inc., San Diego, Calif.

The gel may have an elongation, as measured by ASTM D-638, of at least 55%. According to some embodiments, the elongation is of at least 100%.

According to some embodiments, the holding medium 150 is a self-healing or self-amalgamating gel. This characteristic may allow the holding medium 150 to re-form into a continuous body if the gel is sheared by the insertion and/or removal of fiber optic components 50 from the gel bed.

According to some embodiments, in the case where the holding medium 150 is a gel, each bed 152, 154 has a thickness T (FIG. 3) of at least 0.2 mm and, in some embodiments, in the range of from about 0.1 to 4 mm.

Alternatively, in some embodiments, the holding medium 150 may be a bonding material other than a gel, but having the desired properties described herein. Other suitable types of bonding material for the holding medium 150 include adhesives, epoxies, ethylene vinyl acetate, polyethylene, styrenic block copolymers, polybutenes, styrene butadiene rubbers, or hydrogenated hydrocarbon resin. Adhesives may include pressure-sensitive adhesives that have sufficient tack when dry (i.e., solvent free) with light contact pressure or hot melt adhesives. In some cases, a mastic or double-sided tape may be employed for the holding medium 150.

The holding medium 150 may be a homogenous medium or a combination or composite of materials. For example, according to some embodiments, the holding medium 150 is a composite of a gel and a hot melt adhesive.

According to some embodiments, the holding material 150 has at least the prescribed sufficient tack for at least the intended service life of the holder 100, which, according to some embodiments, is at least 20 years.

According to some embodiments, a release liner (e.g., a releasable film or kraft paper) is placed on the exposed top surface of each bed 152, 154 to maintain the cleanliness of the beds 152, 154 until the time of installation of the fiber optic components.

The holding medium layers or beds 152, 154 may be installed in each shell 120, 130 by any suitable technique. If the holding medium is a material, such as a curable gel, that requires curing, the holding medium material may be cured in situ. Other techniques for installing the beds 152, 154 may include extruding, spraying or rolling the holding medium onto shells 120, 130.

The hardness and tack of the holding medium 150 (e.g., a gel as described herein) can be characterized or determined using measurement methods as follows (referred to herein as the hardness and tack methods) for holding medium layers (e.g., beds 152, 154):

The hardness and tack of the holding medium 150 may be measured using a Texture Technologies Texture Analyzer or like machine, having a load cell to measure force, a 5 gram trigger and a clean ¼ inch (6.35 mm) stainless steel probe. For measuring the hardness, for example, of a 20 mL glass vial containing 12 grams of the holding medium, the probe is forced into the holding medium at the speed of 0.2 mm/sec to a penetration distance of 4.0 mm. The hardness of the holding medium is the force in grams required to force the probe at that speed to penetrate the holding medium specified for 4.0 mm. Higher numbers signify harder materials.

The tack is read from the stress curve generated by tracing the force versus time curve experienced by the load cell when the penetration speed is 2.0 mm/second and the probe is forced into the holding medium 150 a penetration distance of about 4.0 mm. The probe is held at 4.0 mm penetration for 1 minute and withdrawn at a speed of 2.0 mm/second. The tack may be considered to be the amount of force in grams resistance on the probe as it is pulled out of the holding medium 150 when the probe is withdrawn at a speed of 2.0 mm/second from the preset penetration depth.

According to some embodiments, the tack value of the holding medium 150 as measured using the hardness and tack method is at least 4 grams. According to some embodiments, the tack value of the holding material 150 as measured using the hardness and tack method is in the range of from about 8 grams to about 25 grams and, according to some embodiments, from about 12 grams to about 21 grams. For holding material layers having a thickness of less than about 3.5 millimeters, the above-described first test method is modified such that the probe is only inserted to a depth of 1.0 mm. In this case, the tack values determined will be slightly less than those determined using the first test method.

According to some embodiments, the holding medium 150 is a gel having a tack value in the foregoing ranges.

According to some embodiments, the holding medium 150 has a Voland hardness, as measured by a texture analyzer, of between about 5 and 100 grams force. According to some embodiments, the holding medium is a gel having a hardness in the foregoing ranges.

According to some embodiments, the holding medium 150 is a gel having an elongation, as measured by ASTM D-638, of at least 55%. According to some embodiments, the elongation is of at least 100%. The gel may have a stress relaxation of less than 80%.

According to some embodiments, each bed 152, 154 has a width W (FIG. 6) in the range of from about 25 to 45 mm.

According to some embodiments, each bed 152, 154 has a length L1 (FIG. 6) in the range of from about 48 to 54 mm.

According to some embodiments, each bed 152, 154 has an area (length L1 times width W) in the range of from about 1200 mm$^2$ to 2400 mm$^2$. In some embodiments, the length L2 (FIG. 6) of each shell marginal section 127 is in the range of from about 5 to 7 mm.

The fiber optic splice sleeve 50 may be of any suitable construction and surrounds a splice (e.g., a fusion or mechanical splice) between optical fibers 62. Such splice sleeves are well known to those of skill in the art and will not be described herein in detail. Suitable fiber optic splice sleeves may include the SMOUV-1120-01 or SMOUV-1102-2 fiber optic splice sleeves available from Tyco Electronics Corporation.

The splice enclosure 20 and the fiber optic component holder 100 can be used as follows in accordance with methods of the present invention to form the fiber optic connection assembly 5 (FIGS. 1-4). In some embodiments, the beds 152 and 154 are premounted on the shells 120 and 130. The holder subassembly 121 of the holder 100 is secured to a splice tray 40 by the slots 42 and the tabs 125. For example, the holder 100 may be snapped onto the splice tray 40.

The fiber optic cables 60 are routed through the end cap 26 and selected fibers 62 thereof are spliced. A splice sleeve 50 is installed over each splice. Excess lengths or slack sections of the fibers 62 may be wound or wrapped within the enclosure 20 (e.g., in the tray 40 as illustrated) to facilitate subsequent handling of the optical fibers 62.

Each splice sleeve 50 is laid onto and into intimate contact with the holding medium bed 152. The splice sleeve 50 may be laid on the bed 152 such that the lengthwise axis C-C (FIG. 4) of the splice sleeve 50 is generally parallel to the lengthwise axis A-A of the holder subassembly 121 and end sections of the splice sleeve 50 or exposed sections of the fibers 62 extend out of the cavity 124B through the end openings 124A. The splice sleeve 50 may be pressed down or embedded into the bed 152 by hand, for example.

Figure 3:
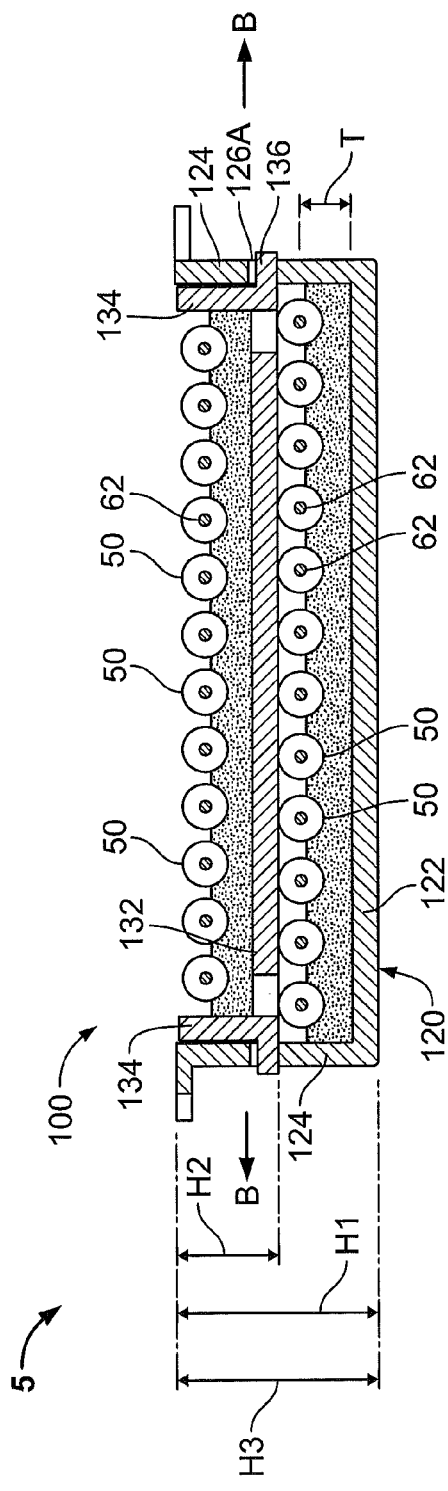
FIG. 3 is a cross-sectional view of a fiber optic component holder and splice sleeves of FIG. 2 taken along the line 3-3 of FIG. 2.
Figure 4:
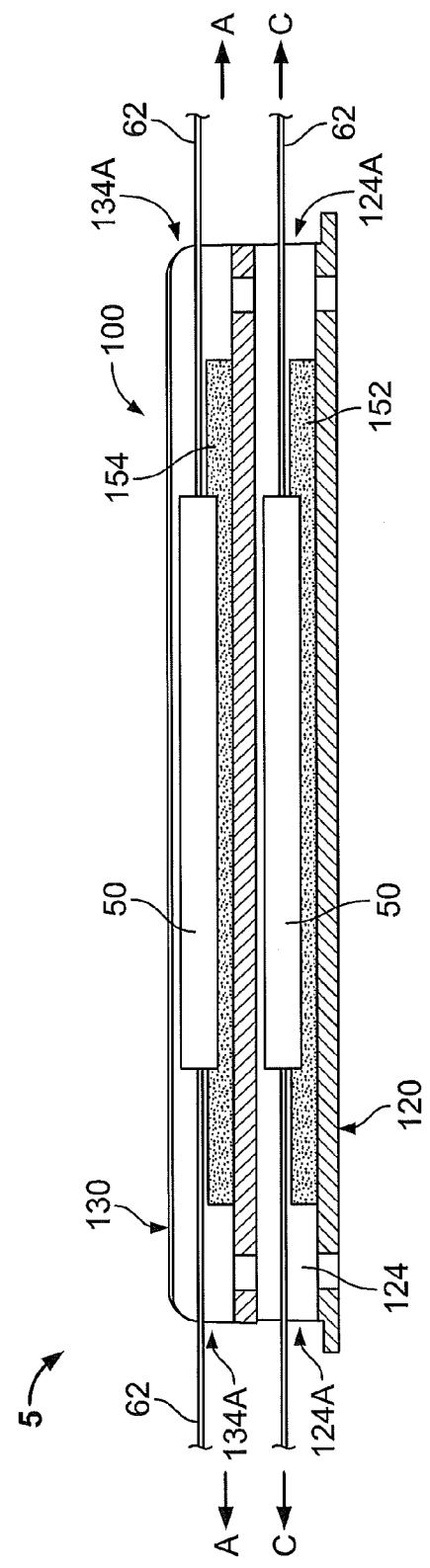
FIG. 4 is a cross-sectional view of the fiber optic component holder and splice sleeves of FIG. 3 taken along the line 4-4 of FIG. 2.

The foregoing procedure can be repeated for each splice sleeve 50 the installer wishes to mount in the holder subassembly 121. When the holder subassembly 121 is full or the installer otherwise wishes to instead mount the splice sleeve 50 on the upper holder subassembly 131, the upper holder subassembly 131 is stacked and secured to the lower holder subassembly 121 by interlocking the mount tabs 136 with the mount slots 126A (FIG. 3). The splice sleeves 50 can then be mounted in the cavity 134B and into intimate contact with the bed 154, and thereby bonded to the bed 154 in the same manner as described above for the holder subassembly 121.

After the splice sleeves 50 have been installed, the cover 24 can be installed on the end cap 26 to form the housing assembly 22 about the splice tray 40. In this manner, the holder 100 and the splice sleeves are contained in the environmentally sealed chamber 28.

Each of the relatively thin beds 152, 154 of the holding medium 150 provides a soft, deformable, tacky surface that adheres to each splice sleeve 50. The adhesion strength of the holding material 150 is sufficient to grip or hold each splice sleeve 50 in place. However, the splice sleeves 50 (or other optical fiber connection devices) can be removed from the tacky surface of the bed 152 or 154 and replaced once or more.

It will be appreciated that the splice sleeve 50 need not be mounted on the holder 100 all in the same session. For example, a technician may install some splice sleeves 50 in the holder 100, close the enclosure 20, and at some later time (e.g., when optical fibers to new subscribers are to be connected or the network is otherwise to be reconfigured) reopen the enclosure 20 and install additional splice sleeves 50 in the holder 100. Because the holding material 150 releasably holds the splice sleeves 50, the splice sleeves 50 may also be removed from the holder 100 at will. Moreover, because the holding material 150 retains its tack upon removal of the splice sleeve 50, the same or a different splice sleeve 50 can be placed at the same location on the bed 152 or 154 formerly occupied by the splice sleeve 50 and will be bonded thereto by the residual tack of the bed 152, 154. The holder subassemblies 121, 131 can be disengaged and separated from one another and from the splice tray 40 as needed.

A fiber optic component holder 100 as disclosed herein can enable an increased storage density of the splice sleeves or other fiber optic connection devices. For example, in the space required to hold a maximum of twelve or even six splice sleeves in some known splice holders, a fiber optic connection device holder 100 as described herein may have a maximum capacity of twenty-four (i.e., a set of twelve splice sleeves 50 in each holder subassembly 121, 131). According to some embodiments, the overall height 113 (FIG. 3) of the holder 100 when the holder subassemblies 121, 131 are stacked as shown in FIGS. 1-4 is in the range of from about 9 to 11 mm. This improvement in packing density can permit users to store additional fiber optic devices in existing storage trays and racks. This aspect may be particularly valuable in the case of optical network operators who are expanding the number of wavelengths being transmitted. Existing splice holders of conventional density may be replaced with high-density splice holders according to the present invention.

The holder 100 can accommodate different sized splice protectors or other fiber optic components while properly cushioning the components against mechanical shock and vibration. In particular, beds 152, 154 formed of a gel can provide vibration damping that serves to isolate the fiber optic connector or splice for a more robust mounting. Vibration may be a significant hazard when the enclosure 20 is located in certain environments, such as proximate a roadway or where an aerial mounted enclosure 20 is subjected to wind forces.

According to some embodiments, the holding material 150 maintains a tack force of at least 10 grams (measured using the hardness and tack method over a temperature range of from about 40° C. to 75° C.

While the fiber optic component holder 100 has been described herein as used to hold one or more splice sleeves 50, the holder 100 may be used to hold other fiber optic components having suitable dimensions. These other types of fiber optic components may be mounted and secured in the holder 100 in substantially the same manner as described for the splice sleeves 50. The fiber optic components may include active or passive fiber optic devices. The fiber optic devices may include fiber optic connection devices or non-connecting devices. According to some embodiments, the fiber optic connection device is a fiber optic splitter. According to some embodiments, the fiber optic connection device is an optic wavelength filter. According to some embodiments, the fiber optic connection device is a mechanical splice connector. In some embodiments, the fiber optic component is an optical fiber or bundle of optical fibers in intimate contact with and directly bonded to the holding medium 150 by the tack thereof.

Figure 10:
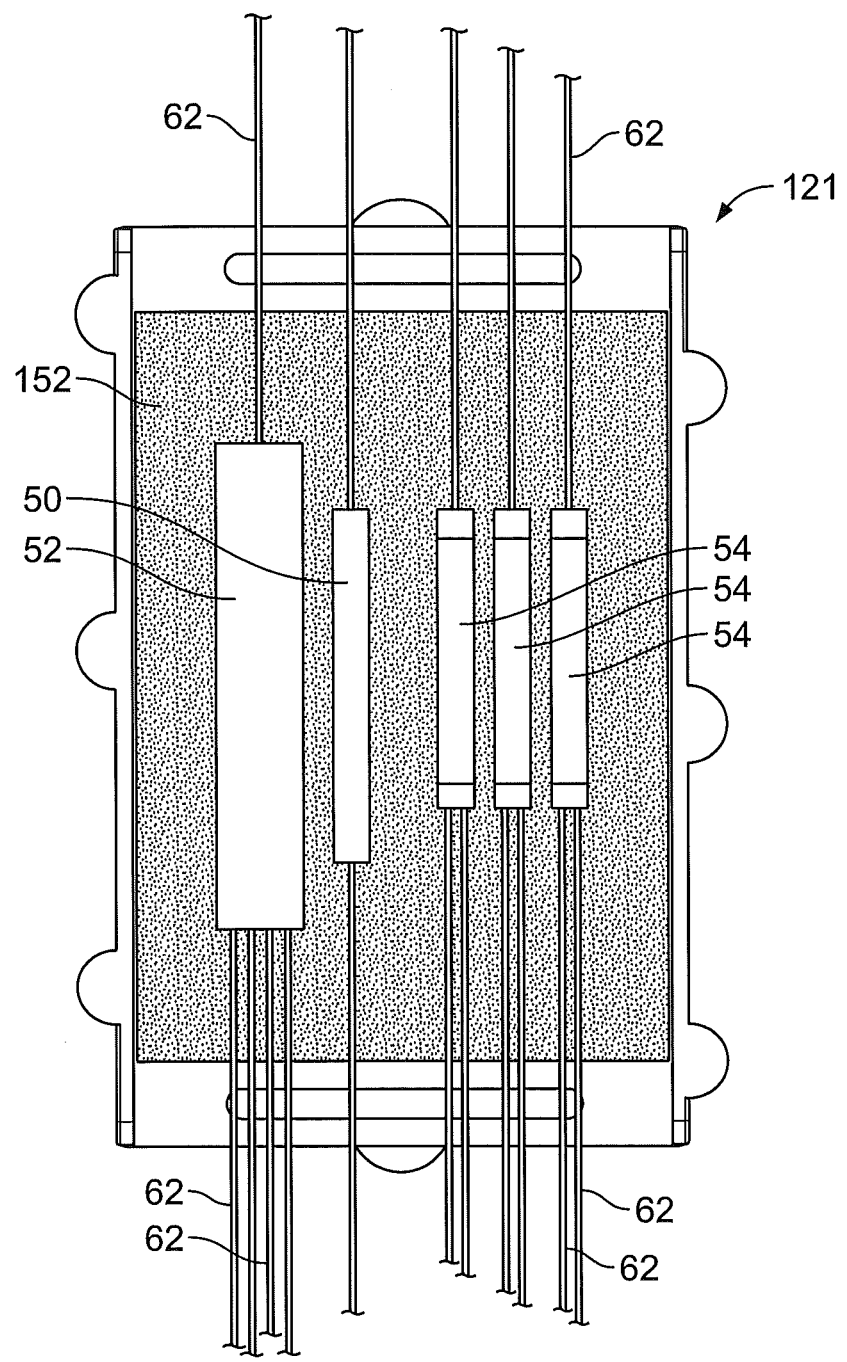
FIG. 10 is a top plan view of the lower holder subassembly of FIG. 6 with an exemplary alternative combination of fiber optic components mounted thereon.

A given fiber optic component holder 100 may hold one or more of the fiber optic components and in any desired combination. For example, with reference to FIG. 10, the holder 100 (only the lower holder subassembly 121 is shown in the figure) may hold a splice sleeve 50, a fiber optic splitter 52, and three in-line optic wavelength filters 54. It will be appreciated that the set of fiber optic components depicted in FIG. 10 is merely exemplary and other combinations of fiber optic components may be installed in the holder 100.

According to some embodiments, the material and/or configuration of the shells 120, 130 and the holding medium 150 are selected such that, when the fiber optic component is pulled away from the shell 120, 130 to remove the fiber optic component, the holding material 150 will remain bonded to the base wall 122, 132 and cohesive. That is, the bed 152, 154 from which the fiber optic component is being removed will maintain its state of physical configuration and location on the shell 120, 130 so that it is ready for re-placement of the same or another fiber optic component. That is, the effective adhesion strength between the bed 152, 154 and the base wall 122, 132 and the cohesive strength of the holding medium 150 each exceed the adhesive strength between the bed 152, 154 and the fiber optic component.

The base wall 122, 132 may be textured or include other surface features to enhance the attachment of the bed 152, 154 to the base wall 122, 132. The base wall 122, 132 may include a layer of a foam material (e.g., a rigid foam member) to which the 152, 154 directly bonds.

While the shells 120, 130 have been illustrated in the Figures as two separate elements mateable via the interlocking features 126A, 136A, other mechanisms or arrangements may be employed to couple the shells 120, 130 such that they are movable with respect to one another and can be separated to mount fiber optic components as needed. According to some embodiments, the shells 120, 130 are pivotally joined by a hinge (e.g., a mechanical or living hinge).

According to still further embodiments, the holder 100 may include a lid to cover the cavity 134B of the upper holder subassembly 131. The lid may be attached to the shell 130 by a hinge or other coupling features (e.g., snap in interlocks). The lid may be a lid of the splice tray 40 that, when installed, covers a portion of the splice tray 40 including the holder 100.

While a holder 100 having two holder subassemblies 121, 131 has been shown, according to some embodiments, more than two holder subassemblies may be used in combination. For example, three or more holder subassemblies may be stacked in series or otherwise. Alternatively, the holder may include only one shell and holding material bed.

While the shells 120, 130 as shown are generally rectangular, other shapes and sizes of shells or other substrates may be employed.

Some embodiments may include or be deployed in enclosures or other structures other than environmentally sealed enclosures of the type illustrated in FIG. 1. For example, in some embodiments, a holding mechanism as disclosed herein is used or provided to intimately engage and releasably and replaceably bond to a fiber optic component to thereby secure the fiber optic component to a cross-connect cabinet, a splice tray of a different design than illustrated herein, or a fixture, cabinet or rack in a telecommunications network central office.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for securing a fiber optic component, the method comprising:
   providing a holding medium having a tack and mounted on a substrate; and
   placing the fiber optic component in intimate contact with the holding medium to thereby secure the fiber optic component to the substrate;
   after placing the fiber optic component in intimate contact with the holding medium:
      removing the fiber optic component from the holding medium, wherein the holding medium remains mounted on the substrate; and thereafter
      re-placing the fiber optic component or a further fiber optic component on the holding medium to secure said fiber optic component or further fiber optic component to the substrate;
   wherein the tack of the holding medium releasably bonds the fiber optic component to the holding medium and the holding medium retains its tack and remains mounted on the substrate upon removal of the fiber optic component to permit re-placement of the fiber optic component or placement of a further fiber optic component on the holding medium to secure said fiber optic component or further fiber optic component to the substrate; and
   wherein the holding medium is a gel.

2. The method of claim 1 wherein the holding medium is premounted on the substrate prior to placing the fiber optic component in intimate contact with the holding medium to secure the fiber optic component to the substrate.

3. The method of claim 1 wherein the fiber optic component is a fiber optic connection device.

4. The method of claim 1 wherein the fiber optic component is an optical fiber.

5. The method of claim 1 wherein the holding medium has a tack in the range of from about 8 to 25 grams.

6. The method of claim 1 wherein the holding medium has a thickness in the range of from about 0.1 to 4 mm.

7. The method of claim 1 wherein the substrate is a first substrate and further including:
   providing a second holding medium having a tack and mounted on a second substrate, the second substrate being mounted on the first substrate and movable with respect thereto; and
   placing a second fiber optic component in intimate contact with the second holding medium to thereby secure the second fiber optic component to the second substrate;
   wherein the tack of the second holding medium releasably bonds the second fiber optic component to the second holding medium and the second holding medium retains its tack upon removal of the second fiber optic component to permit re-placement of the second fiber optic component or placement of a further fiber optic component on the second holding medium to secure said second fiber optic component or further fiber optic component to the second substrate.

8. The method of claim 7 including:
   bonding a first set of splice sleeves to the first substrate using the first holding medium;
   bonding a second set of splice sleeves to the second substrate using the second holding medium; and
   stacking the first substrate on the second substrate such that the second set of splice sleeves overlies the first set of splice sleeves.

9. The method of claim 1 including providing a splice enclosure assembly, the splice enclosure assembly including a housing assembly defining an environmentally sealed interior chamber when in a closed configuration, wherein the substrate and the holding medium are disposed in the interior chamber when the housing assembly is in the closed configuration.

10. A fiber optic component holder for securing a fiber optic component, the fiber optic component holder comprising:
   a substrate to support the fiber optic component; and
   a holding medium mounted on the substrate;
   wherein the holding medium has a tack such that, when the fiber optic component is placed in intimate contact with the holding medium, the holding medium releasably bonds with the fiber optic component to secure the fiber optic component to the substrate, and, upon removal of the fiber optic component from the holding medium, the holding medium will retain its tack and remain mounted on the substrate to permit re-placement of the fiber optic component or placement of a further fiber optic component on the holding medium to secure said fiber optic component or further fiber optic component to the substrate; and
   wherein the holding medium is a gel.

11. The fiber optic component holder of claim 10 wherein the holding medium has a tack in the range of from about 8 to 25 grams.

12. The fiber optic component holder of claim 10 wherein the holding medium has a thickness in the range of from about 0.1 to 4 mm.

13. The fiber optic component holder of claim 10 wherein the substrate is a first substrate and including:
 a second substrate to support a second fiber optic component, the second substrate being mounted on the first substrate and movable with respect thereto; and
 a second holding medium mounted on the second substrate;
 wherein the second holding medium has a tack such that, when the second fiber optic component is placed in intimate contact with the second holding medium, the second holding medium releasably bonds with the second fiber optic component to secure the second fiber optic component to the second substrate, and, upon removal of the second fiber optic component from the second holding medium, the second holding medium will retain its tack to permit re-placement of the second fiber optic component or placement of a further fiber optic component on the second holding medium to secure said second fiber optic component or further fiber optic component to the second substrate.

14. The fiber optic component holder of claim 10 including the fiber optic component mounted in intimate contact with the holding medium.

15. A splice enclosure assembly for receiving optical fibers and protecting fiber optic splices between said optical fibers, the splice enclosure assembly comprising:
 a housing assembly defining an environmentally sealed interior chamber when in a closed configuration;
 a fiber optic component holder disposed in the interior chamber to secure a fiber optic component, the fiber optic component holder comprising:
  a substrate to support the fiber optic component; and
  a holding medium mounted on the substrate; and
 a fiber optic connection device mounted in intimate contact with the holding medium;
  wherein the holding medium has a tack such that the holding medium releasably bonds with the fiber optic connection device to secure the fiber optic connection device to the substrate, and, upon removal of the fiber optic connection device from the holding medium, the holding medium will retain its tack and remain mounted on the substrate to permit re-placement of the fiber optic connection device or placement of a further fiber optic component on the holding medium to secure said fiber optic connection device or further fiber optic component to the substrate; and
  wherein the holding medium is a gel.

16. The splice enclosure assembly of claim 15 including a splice tray mounted in the chamber, and wherein the fiber optic component holder is removably and replaceably mounted on the splice tray.

17. The method of claim 3 wherein the fiber optic connection device is selected from the group consisting of a fiber optic splice sleeve, a fiber optic splitter, an optic wavelength filter, and a mechanical splice connector.

18. The splice enclosure assembly of claim 15 wherein the gel has a tack in the range of from about 8 to 25 grams.

19. The fiber optic component holder of claim 10 wherein the gel has a tack in the range of from about 8 to 25 grams.

20. The fiber optic component holder of claim 14 wherein the fiber optic component is a fiber optic connection device.

21. A method for securing a fiber optic component, the method comprising:
 providing a holding medium having a tack and mounted on a substrate; and
 placing the fiber optic component in intimate contact with the holding medium to thereby secure the fiber optic component to the substrate;
 wherein the tack of the holding medium releasably bonds the fiber optic component to the holding medium and the holding medium retains its tack and remains mounted on the substrate upon removal of the fiber optic component to permit re-placement of the fiber optic component or placement of a further fiber optic component on the holding medium to secure said fiber optic component or further fiber optic component to the substrate;
 wherein the holding medium is a gel; and
 wherein the fiber optic component is a fiber optic connection device.

22. The method of claim 21 wherein the fiber optic connection device is selected from the group consisting of a fiber optic splice sleeve, a fiber optic splitter, an optic wavelength filter, and a mechanical splice connector.

23. The splice enclosure assembly of claim 15 wherein the fiber optic connection device is selected from the group consisting of a fiber optic splice sleeve, a fiber optic splitter, an optic wavelength filter, and a mechanical splice connector.

\* \* \* \* \*